March 21, 1950 W. RUSKA 2,501,538
MAGNETIC MEASURING INSTRUMENT
Filed April 9, 1945 2 Sheets-Sheet 1

WALTER RUSKA
INVENTOR.

BY Lester B. Clark
& Ray L. Smith
Attorneys.

March 21, 1950   W. RUSKA   2,501,538
MAGNETIC MEASURING INSTRUMENT
Filed April 9, 1945   2 Sheets-Sheet 2

WALTER RUSKA
INVENTOR.

BY Lester B. Clark
& Ray L. Smith
Attorneys.

Patented Mar. 21, 1950

2,501,538

UNITED STATES PATENT OFFICE 2,501,538

MAGNETIC MEASURING INSTRUMENT

Walter Ruska, Houston, Tex., assignor to Ruska Instrument Corporation, Houston, Tex., a corporation of Texas Application April 9, 1945, Serial No. 587,375

5 Claims. (Cl. 346—107)

This invention relates to geophysical prospecting apparatus, and more particularly to magnetic prospecting in which the accurate determination of magnetic anomalies at the surface of the earth are utilized to locate subsurface structures which cause such anomalies.

In the use of the magnetometer for locating magnetic anomalies and in determining the areal extent thereof and the amplitude of magnetic variations therein, it is customary to provide a series of stations within the area being investigated. At least one of such stations is used as a base station at which repeated observations must be made so that diurnal or other variations in magnetic field, temperature, etc., may be known and necessary corrections applied to readings at the various field stations. This procedure, as heretofore carried out, requires much time and also increases the hazard of damage to the highly sensitive and accurate instrument required for obtaining necessary information.

It is the primary object of the invention to provide a magnetometer of the type described herein which is simpler and more rugged, and which possesses improved sensitivity and accuracy over instruments heretofore designed.

Another object of the invention is to provide an instrument that can be set up, particularly at a base station and will thereafter provide, over a period of time, graphical information which will enable continuous observations in the field, a check being made with such instrument only at the beginning and the end of a series of observations.

Another object is to provide an instrument in which both visual and recorded observations may be made simultaneously.

It is also an object to provide in a prospecting instrument an optical system which permits the observation of the deflection of the moving or magnetic system of the instrument by light reflected from such moving system, and which instrument at the same time graphically records movement of the moving system by means of a beam of light reflected therefrom.

A still further object is to provide a device which includes instrumentalities for simultaneously recording variations in correlated factors such as magnetic field strength and temperature as well as the time over which the recording takes place.

A still further object is to provide a device that may be utilized over a period of time without disturbance by the presence of an operator after the device has been placed in operation.

A still further object is to provide a magnetometer having an improved clamping action for the moving magnetic system thereof.

It is also an object to provide improved temperature compensation in a prospecting instrument of the class hereinafter described.

The foregoing objects of the invention and additional objects will be more fully apparent from the following description of the invention, considered in connection with the accompanying drawings in which.

Figure 2:
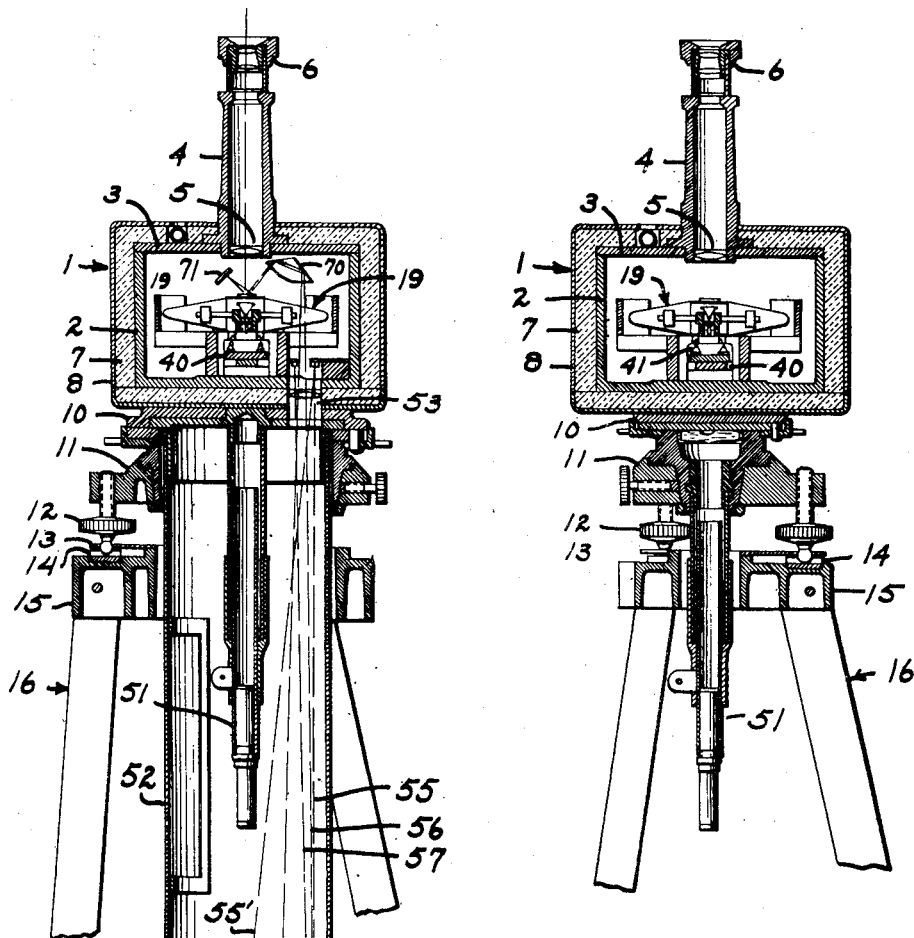
Fig. 2 is a vertical sectional view similar to that shown in Fig. 1, this embodiment providing for visual observation only of the moving system.
Figures 1, 7:
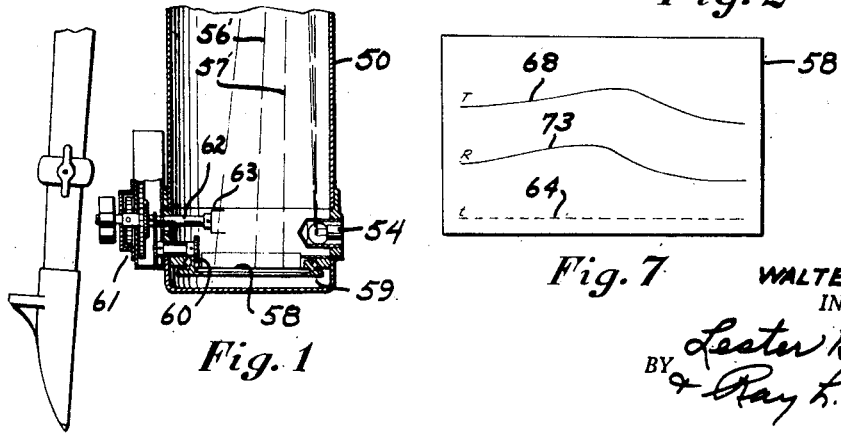
Fig. 1 is a vertical sectional view through an instrument embodying the invention and including the automatic recording feature.
Fig. 7 shows a graphical record produced in accordance with the invention.

In accordance with the invention, it is intended that the procedure in magnetic surveying may be expedited by utilizing an instrument such as that shown in Fig. 1 at a base station, throughout a period of time during which areal observations or magnetic observations at a plurality of points are made with the instrument shown in Fig. 2. Such procedure also avoids any disturbance of the instrument at the base station thereby enhancing the accuracy in records obtained to supplement the improved sensitivity and accuracy of the instrument of the invention. At the same time visual observations may be made at the base station, if desired, without interrupting the recordings being made by that instrument.

The instrument shown in the drawings includes an enclosure 1 comprising the inner housing 2 having cover 3 which carries the telescope 4 with objective 5 and eye-piece 6. An insulating covering 7, such as cork, encases the housing 2 and is protected on its exterior by a shield 8 of any suitable material.

The enclosure 1 rests upon a base 10 suitably secured to mounting ring 11 provided with adjustable mounting and leveling screws 12 engageable in ears 13 whereby the screws 12 are held in intimate contact with pads 14 on the head 15 of the tripod 16.

Figure 5:
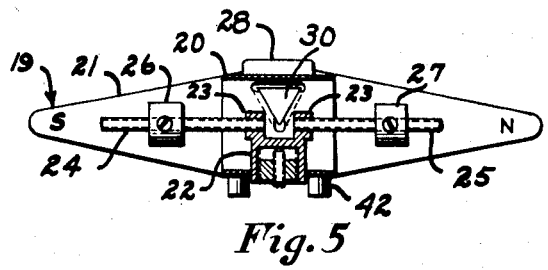
Fig. 5 is a side elevation of one embodiment of the moving system, the side portion thereof being cut away to more clearly indicate the construction.
Figure 6:
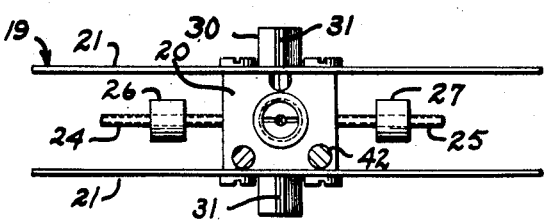
Fig. 6 is a bottom plan view of the moving system shown in Fig. 5.

The magnetic system 19, as best seen in Figs. 5 and 6, comprises body 20 to which the magnets 21 are secured. A support 22 within the body 20 has oppositely extending bosses 23 in which are secured temperature compensating rods 24 and 25 which have different temperature coefficients of expansion, and which respectively carry masses 26 and 27 adjustable axially thereof. The construction is therefore such that changes in the magnetization of the magnets due to variations in temperature will be compensated by simultaneously occurring shifting of the entire balance system, and in this manner the desired condition of balance throughout the working range of temperatures can be obtained.

A reflector such as a mirror 28 is secured upon the balance assembly so that desired observations and a graphical record may be made by the reflection of light from such mirror.

Figure 4:
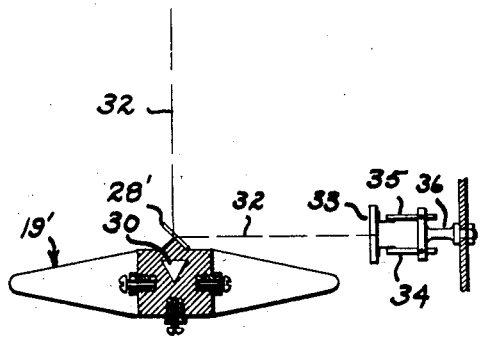
Fig. 4 is an elevational view partly in section, showing one manner of compensating for temperature change.

An alternative structure for effecting desired temperature compensation is shown in Fig. 4 wherein the moving system or balance assembly 19' is itself uncompensated. However, the reflector mirror 28' is mounted at an angle of 45° upon the moving system so that observation is made along the path 32 to reflector means comprising mirror 33 supported upon spaced differentially thermoresponsive elements 34 and 35 attached to support 36. By means of this construction any change in the moving system 19', resulting from temperature change within the instrument housing is automatically compensated by the relative change in position of the mirror 33 as a result of differential dimensional change in the elements 34 and 35.

The prismatic support 30 for either of the systems 19, or 19' extends transversely of the system, and the protruding ends provide knife edge 31 which engages suitable supports fixed within the housing 2. The system is tiltably mounted upon the knife edge 31 when the instrument is in use.

When the instrument is not in use it is important that the moving or magnetic system 19 be lifted and retained in an elevated position until the instrument is again to be used in making magnetic measurements. To accomplish this purpose there is provided a vertically movable clamp member 40 which carries support tips 41 having spherical surfaces to engage within tapered nether surfaces of lugs 42 on the moving assembly or system 19.

It is of importance that the moving system be accurately lifted from the knife edge 31, and that the system be likewise accurately returned to tilting position upon this knife edge when the instrument is to be used. To this end it is to be noted that the lugs 42 are three in number, and are symmetrically arranged relative to a vertical plane passing through the knife edge 31 of the system. Each of the lugs is provided with a V-seat, as shown, extending radially of the vertical axis of the body 20 and adapted to receive one of the support tips 41. This arrangement permits accurate vertical adjustment of the support tips 41 and/or the lugs 42 whereby lifting of the clamp member 40 will simultaneously lift both ends of the knife edge 31 from cooperating supports within the housing 2. In a similar manner, lowering of the clamp member 40 will effect accurate and simultaneous engagement of the ends of the knife edge 31 in a predetermined plane with the cooperating supports.

Visual observations of the position of the moving system are made by means of the telescope 4 in a manner well known in the art. However, in one form of the invention provision is also made to produce a graphical record to furnish desired information over a period of time. For this purpose the instrument as shown in Fig. 1 is provided with a downwardly extending housing 50 within which there is mounted a compensating magnet 51 which is made accessible through an opening 52 in the side of the housing. A passage 53 in the enclosure 1 communicates with the interior of the housing 50 to permit the passage of light rays 55, 56, and 57 from the lamp 54 in the lower end of the housing 50. Means is provided for redirecting these rays along the paths indicated at 55', 56', and 57' to impinge upon a recording strip 58 having a photosensitive surface and movable transversely of the housing 50 upon a carriage 59. This carriage is driven through a rack and pinion 60 actuated by any suitable means such as the spring driven timing mechanism 61 on the exterior of the housing.

The timing mechanism includes a shaft 62 which extends to the interior of the housing 50 and carries thereon a shutter member 63 comprising prongs which intercept the light ray 55'. In this manner the record of the light ray 55' is intermittent as indicated at 64 in Fig. 7 so that it is possible to determine the time at which any portion of the graphical record was obtained.

Figure 3:
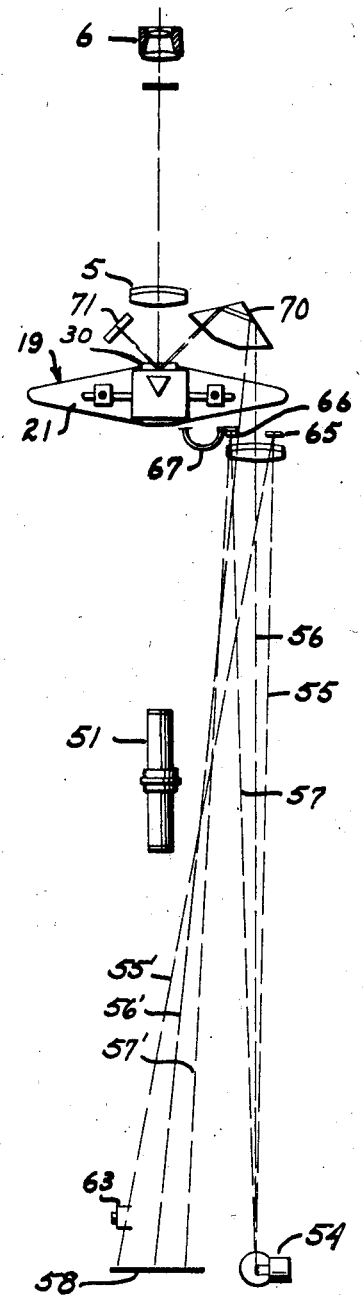
Fig. 3 is a diagrammatic view showing the combined visual observation and recording systems comprising a feature of the invention.

As best seen in Fig. 3 the light ray 55 impinges upon a mirror 65 within the enclosure 1 and is thence redirected along the path 55' to produce the timing record just described. In a similar manner the light ray 57 impinges upon a mirror 66 which is mounted upon a thermoresponsive arm 67 within the enclosure 1. This beam of light is thence redirected along the path 57' to produce the graphical record of temperature variation as shown at 68 in Fig. 7.

The light beam 56 is utilized to indicate the movements of the system 19; this is accomplished by double reflecting means such as a mirror or a prism 70 mounted within the enclosure 1. The beam is thus directed upon the reflector 28 and thence to the mirror 71, likewise mounted within the enclosure 1. The reflected beam thence follows the path 56' which is instrumental in producing the graphical record of movements of the system 19 as indicated at 73 in Fig. 7.

It seems apparent that observations and recordings accomplished in the manner just indicated enable an accurate determination of variations in magnetic intensity whereby magnetic anomalies, including the extent and intensity thereof, can be readily analyzed for purposes of determining geological structures which give rise to such anomalies.

The operation of the invention as above described and the advantages thereof are believed apparent from the description. By way of summary and reiteration it will be pointed out that a desirable procedure is that of setting up an instrument such as that shown in Fig. 1 at a base station, and placing the recording mechanism of the device in operation. There will thus be produced a graphical record such as that shown in Fig. 7 from which the temperature changes as shown at 68, and the variations in magnetic field intensity as shown at 73, can be correlated with the timing graph shown at 64. Inasmuch as the time for initiation of observations is known it is possible to readily determine the trend of instrument temperature and magnetic field intensity throughout the period of recording.

During the recording interval it is possible for the surveying party to proceed along predetermined survey lines to make observations within the area surveyed. Return to the base station may be had at any time for purposes of checking with the base instrument. The invention is such however, that such checking at the base station will in no way interfere with the recording actually taking place.

Accordingly survey information may be had expeditiously with a minimum of disturbance to the highly sensitive instruments utilized in making the survey.

Broadly the invention comprehends a precision instrument which automatically compensates for temperature change, which provides for both visual and recorded observations and which enables the making of series of observations with the minimum of skilled personnel.

The invention claimed is:

1. In a device of the class described, an enclosure, a moving system therein, a reflector mounted on said moving system, a telescope arranged to observe the position of said system, a reflecting prism mounted at one side of the optical axis of said telescope, a source of light mounted to direct light rays upon the prism, reflector means opposite said prism to redirect from the reflector and thence through said prism, rays directed upon the prism from said source of light, and means in the enclosure for recording the excursions of the redirected rays as produced by movements of the system, whereby a continuous record of the excursions of the rays and simultaneous visual observations of the position of the moving system are had.

2. In a device of the class described, an enclosure, a moving system therein, a reflector mounted on said moving system, a telescope arranged to observe the position of said system, a source of light mounted to direct rays of light upon said reflector, reflector means at one side of the optical axis of the telescope to redirect rays of the light source upon said reflector, and means in the enclosure for recording the excursions of the redirected rays as produced by movements of the system, whereby a continuous record of the excursions of the rays and simultaneous visual observations of the position of the moving system are had.

3. In a device of the class described, an enclosure, a moving system therein, a reflector on said system, a housing extending from said enclosure, there being an opening in the enclosure communicating with the interior of said housing, means for deflecting a beam of light from said reflector through said opening, means directing a second beam of light in a path substantially parallel to the first mentioned beam, timed means for interrupting said second beam of light, and means for simultaneously recording the interruptions and excursions of said beams, whereby correlated side-by-side time and system movement records are had.

4. In a magnetometer a balance assembly comprising, a body, magnets secured thereto at opposite sides in spaced parallel relation, means supporting said assembly for oscillation about an axis extending transversely of the body, and a group of three spaced lifting lugs on said assembly, each of said lugs having a V-seat in its nether face extending radially of the vertical axis of the body and adapted to be engaged by clamping means for lifting the assembly from the supporting means, one of said lugs being located in about a vertical plane through said transverse axis and the other two of said lugs being spaced therefrom along the axis and symmetrically spaced at opposite sides of the vertical axis of the body.

5. In a magnetometer a balance assembly comprising, a body, magnets secured thereto in spaced parallel relation, means supporting said assembly to oscillate about a transverse axis, a reflector mounted on said assembly, a second reflector mounted to receive and transmit a beam of light reflected from said first mentioned reflector, and thermo responsive means supporting said second reflector in spaced relation with the first mentioned reflector whereby movement of the assembly caused by temperature changes is compensated by movement of the second reflector.

WALTER RUSKA.

REFERENCES CITED

The following references are of record in the file of this patent:

UNITED STATES PATENTS

| Number | Name | Date |
|---|---|---|
| 1,432,570 | Roux | Oct. 17, 1922 |
| 1,441,635 | Rived | Jan. 9, 1923 |
| 1,858,384 | Andre | May 17, 1932 |
| 1,903,969 | Anderson | Apr. 18, 1933 |
| 2,010,245 | Roux | Aug. 6, 1935 |
| 2,060,963 | Van Degrift | Nov. 17, 1936 |
| 2,423,285 | Badmaieff | July 1, 1947 |

FOREIGN PATENTS

| Number | Country | Date |
|---|---|---|
| 572,094 | Germany | Mar. 10, 1933 |
| 355,418 | Great Britain | Aug. 27, 1931 |